United States Patent
Lin et al.

(10) Patent No.: US 8,744,255 B2
(45) Date of Patent: Jun. 3, 2014

(54) AUTO-FOCUS METHOD

(75) Inventors: Chien-Hsiang Lin, Taoyuan County (TW); Ming-Jiun Liaw, Miaoli County (TW)

(73) Assignee: Altek Corporation, Hsinchu (TW)

(*) Notice: Subject to any disclaimer, the term of this patent is extended or adjusted under 35 U.S.C. 154(b) by 3 days.

(21) Appl. No.: 13/603,440

(22) Filed: Sep. 5, 2012

(65) Prior Publication Data
US 2014/0029929 A1 Jan. 30, 2014

(30) Foreign Application Priority Data
Jul. 26, 2012 (TW) .............................. 101127066 A (51) Int. Cl.
*G03B 13/36* (2006.01)
(52) U.S. Cl.
CPC ..................................... *G03B 13/36* (2013.01)
USPC ........................................................... 396/89
(58) Field of Classification Search
USPC ......................................... 396/121; 348/353
See application file for complete search history.

(56) References Cited

U.S. PATENT DOCUMENTS

2004/0240871 A1* 12/2004 Shinohara ...................... 396/104
2005/0168621 A1* 8/2005 Kageyama et al. ........... 348/349

* cited by examiner

*Primary Examiner* — Clayton E Laballe
*Assistant Examiner* — Noam Reisner
(74) *Attorney, Agent, or Firm* — Jianq Chyun IP Office (57) ABSTRACT

An auto-focus (AF) method adapted for an image capturing device includes following steps. When a first press signal generated by a user pressing a button of the image capturing device is detected, a local peak searching method is applied to perform an AF procedure. It is determined whether a second press signal generated by the user pressing the button is detected. If not, it is determined whether a first released signal generated by the user releasing the button is detected. The continuous pressing count is calculated according to the first released signal and the first press signal that are continuously generated. Whether the continuous pressing count is greater than a first threshold is determined. If yes, a global peak searching method is applied to perform the AF procedure. If not, the local peak searching method is still applied to perform the AF procedure.

10 Claims, 5 Drawing Sheets

AUTO-FOCUS METHOD

CROSS-REFERENCE TO RELATED APPLICATION

This application claims the priority benefit of Taiwan application serial no. 101127066, filed on Jul. 26, 2012. The entirety of the above-mentioned patent application is hereby incorporated by reference herein and made a part of this specification.

BACKGROUND OF THE DISCLOSURE

1. Field of Invention

The invention relates to an auto-focus (AF) method, and more particularly, to an AF method to automatically switch between different focus value searching algorithms.

2. Background of the Invention

Digital single lens reflex cameras (also named DSLR) are characterized by delicate and complicated mechanical structures as well as enhanced functionality and maneuverability. In addition to shooting skills of users and environmental factors, the built-in auto-focus (AF) systems of the DSLR also pose a significant impact on the quality of photos.

Generally, according to the AF technology, the lens of the DSLR is moved to adjust the relative distance between the lens and an object to be shot. In response to different locations of the lens, focus evaluation values (hereinafter "the focus values") of a subject frame having the to-be-shot object may be respectively calculated until the peak focus value is acquired. The peak focus value represents the location of the lens where the subject frame may have the optimal sharpness. Nonetheless, in order to obtain the optimal sharpness, the lens is required to move back and forth, and relevant calculations are continuously made. This thus leads to significant time consumption. In consideration of focus speed, DSLR often obtains a local peak through adopting a fast AF technique, i.e., a mountain-climbing method. In this case, however, the auto-focus may fail if a near object and a far object co-exist in the subject frame.

Figure 1:
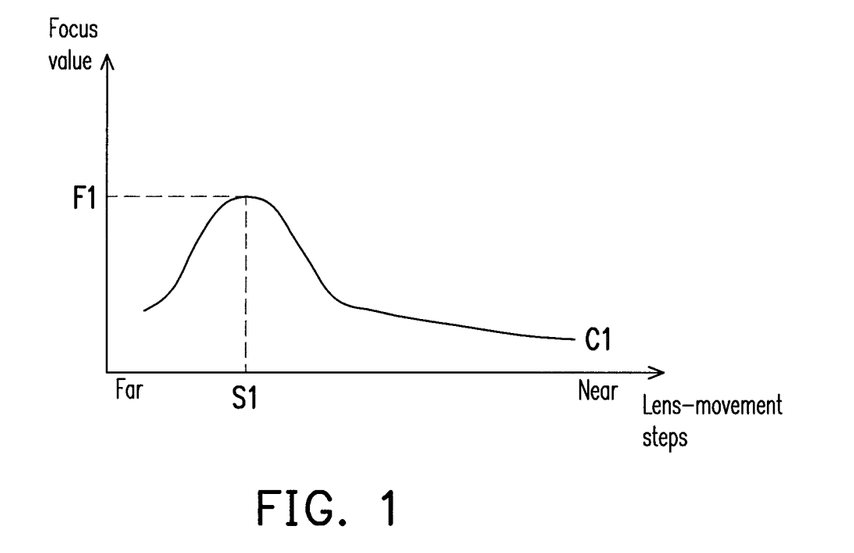
FIG. 1 is a schematic diagram illustrating a focus value curve of an image.
Figure 2A:
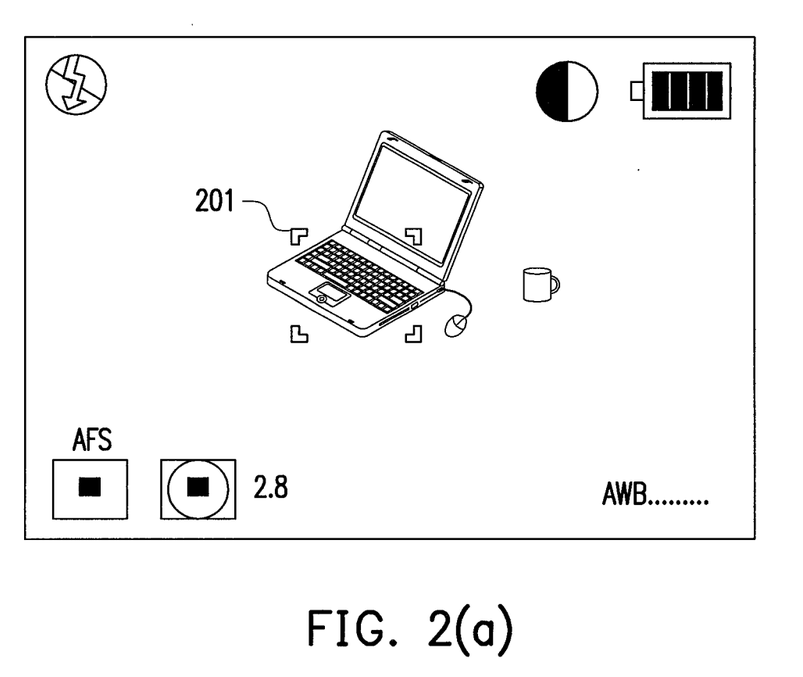
FIG. 2(a) and FIG. 2(b) are schematic diagrams respectively illustrating a display image on a DSLR while the DSLR is focusing a scene.
Figure 2B:
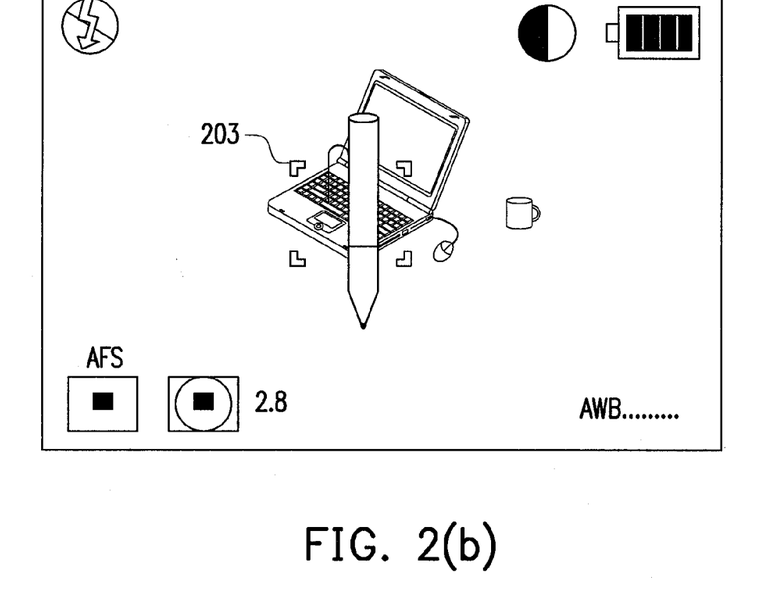

For instance, FIG. 1 is a schematic diagram illustrating a focus value curve of an image. Here, the horizontal axis represents the lens-movement steps, and the vertical axis represents the focus value. FIG. 2(*a*) and FIG. 2(*b*) are schematic diagrams respectively illustrating a display image on a DSLR while the DSLR is focusing a scene. The focus value curve C1 shown in FIG. 1 indicates calculations made on the subject frame as shown in FIG. 2(*a*), for instance. According to the subject frame shown in FIG. 2(*a*), the to-be-shot object includes a notebook computer, a mouse, and a cup at a distance, and the focus frame 201 only contains one focus target (i.e., the notebook computer). As illustrated in FIG. 1, at the location of the lens corresponding to the lens-movement steps S1, the local peak F1 may be obtained, i.e., the location of the lens allows the subject frame to have the optimal sharpness. However, with reference to FIG. 2(*b*), after the AF procedure is successfully performed, another object (a pen) to be shot is also moved into the focus frame 203 for performing the AF procedure. At this time, the focus frame 203 contains the relatively far notebook computer and the relatively near pen. Since the AF procedure is already successfully performed on the notebook computer, the local peak may still be searched first from the locations of the lens corresponding to the lens-movement steps S1 shown by the focus value curve C1 when the AF procedure is performed once again. Namely, in the focus frame 203, the DSLR still focuses the relatively far notebook computer, and thus the autofocus on the relatively near pen fails. In view of the above, how to develop an AF method that may achieve favorable efficiency and satisfactory accuracy is one of the issues to be resolved.

SUMMARY OF THE INVENTION

The invention is directed to an auto-focus (AF) method that may switch between different peak focus value searching algorithms based on the control of an image capturing device by a user, so as to improve AF accuracy.

In an embodiment of the invention, an AF method adapted for an image capturing device is provided. The AF method includes following steps. It is determined whether a first press signal that is generated by a user pressing a button of the image capturing device is detected. If the first press signal is detected, a local peak searching method is applied to perform an AF procedure. Besides, it is determined whether a second press signal that is generated by the user pressing the button is detected. If the second press signal is not detected, it is determined whether a first released signal that is generated by the user releasing the button is detected, and a continuous pressing count is calculated according to the first released signal and the first press signal that are continuously generated. Here, the continuous pressing count is effected by the user continuously pressing and releasing the button. Whether the continuous pressing count is greater than a first threshold is determined. If the continuous pressing count is greater than the first threshold, a global peak searching method is applied to perform the AF procedure. If the continuous pressing count is not greater than the first threshold, the local peak searching method is still applied to perform the AF procedure.

According to an embodiment of the invention, if the second press signal is not detected, the step of calculating the continuous pressing count includes determining whether another first press signal is detected within a predetermined time period after detecting the first released signal. If another first press signal is detected, the continuous pressing count is up counted. If no other first press signal is detected, an initial value of the continuous pressing count is configured to be 0.

According to an embodiment of the invention, the AF method further includes applying the local peak searching method to perform the AF procedure and continuously detecting the second press signal if the continuous pressing count is not greater than the first threshold.

According to an embodiment of the invention, the first press signal is generated by the user pressing the button of the image capturing device to perform the AF procedure. The second press signal is generated by the user pressing the button of the image capturing device to perform an exposure procedure.

According to an embodiment of the invention, the first press signal is generated by the user half-pressing the button, and the second press signal is generated by the user completely pressing the button.

In an embodiment of the invention, an AF method adapted for an image capturing device having a zooming lens is provided. The AF method includes following steps. It is determined whether a first press signal that is generated by a user pressing a button of the image capturing device is detected. If the first press signal is detected, a local peak searching method is applied to perform an AF procedure, and a first lens-movement steps corresponding to the zooming lens is recorded when the AF procedure is successfully performed. It is determined whether a second press signal that is generated by the user completely pressing the button is detected. If the second press signal is not detected, it is determined whether a first released signal generated by the user releasing the button is detected, and the continuous pressing count is calculated according to the first released signal and the first press signal that are continuously generated. Here, the continuous pressing count is effected by the user continuously pressing and releasing the button. Whether the continuous pressing count is greater than a first threshold is determined. If the continuous pressing count is greater than the first threshold, a global peak searching method is applied to perform the AF procedure. If the continuous pressing count is not greater than the first threshold, the local peak searching method is applied to perform the AF procedure, and a second lens-movement steps corresponding to the zooming lens is recorded when the AF procedure is successfully performed.

According to an embodiment of the invention, the AF method further includes following steps. It is determined whether an absolute value of a difference between the second lens-movement steps and the first lens-movement steps is less than a step threshold. If the absolute value of the difference between the second lens-movement steps and the first lens-movement steps is less than the step threshold, the step count is up counted. If the absolute value of the difference between the second lens-movement steps and the first lens-movement steps is not less than the step threshold, the continuous pressing count and the step count are initialized.

According to an embodiment of the invention, the step of determining whether the continuous pressing count is greater than the first threshold further includes determining whether the step count is greater than a second threshold. If the continuous pressing count is greater than the first threshold, and the step count is greater than the second threshold, the global peak searching method is applied to perform the AF procedure.

In light of the foregoing, the AF method described herein may switch between a local peak searching method and a global peak searching method based on the control of a button of an image capturing device by a user. Thereby, not only favorable peak searching speed may be ensured, but also the improvement of AF accuracy may be guaranteed.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EXEMPLARY EMBODIMENTS

At present, common digital single lens reflex cameras (DSLR) often have the two-stage press button design (half-press or full-press). At the first stage, parameters including proper focus, correct exposure and proper white balance are set; at the second stage, an exposure procedure is performed, i.e., the photo shoot is actually taken. Hence, when a user takes a photo with use of the DSLR having the two-stage press button design, the user may first half-press the button to activate an auto-focus (AF) function. Here, the lens of the DSLR performs the AF procedure on the to-be-shot object in the focus frame. After the user ascertains that the AF procedure is successfully performed, the user fully presses the button (the second-stage button) to finish the photo shoot. According to the AF method described herein, the user may, based on the control of the button of an image capturing device, choose to apply different AF searching algorithms. To make the invention more comprehensible, several embodiments are described below as examples to prove that the invention can actually be realized.

Figure 3:
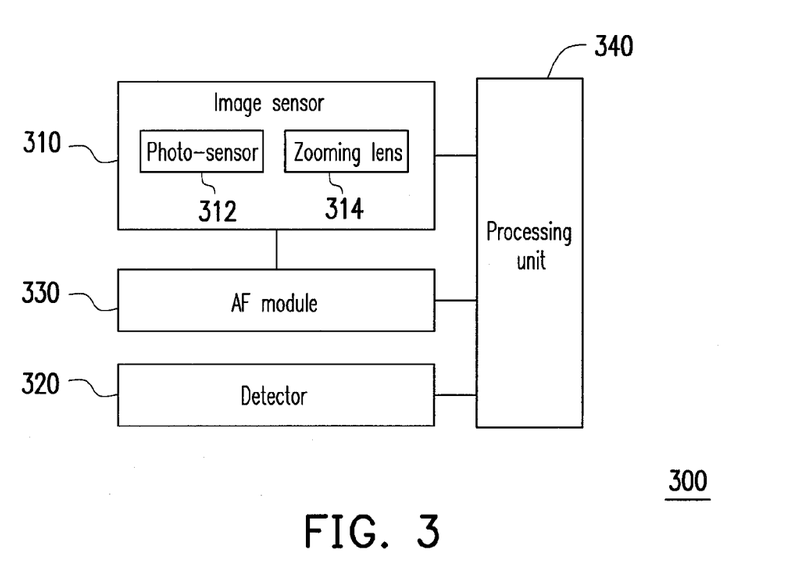
FIG. 3 is a block diagram illustrating an image capturing device according to an embodiment of the invention.

FIG. 3 is a block diagram illustrating an image capturing device according to an embodiment of the invention. With reference to FIG. 3, the image capturing device 300 described in the present embodiment is, for instance, a DSLR, a digital video camcorder (DVC), and so forth, which should not be construed as a limitation to the invention. The image capturing device 300 includes an image sensor 310, a detector 320, an AF module 330, and a processing unit 340. The functions of said components are described below.

The image sensor 310 includes a photo-sensor 312 and a zooming lens 314. The photo-sensor 312 is, for instance, a charge coupled device (CCD), a complementary metal-oxide semiconductor (CMOS) device, and so on; the image sensor 310 may further include an aperture, which should not be construed as limitations to the invention.

The detector 320 serves to detect an operating signal generated by the user pressing or releasing a button of the image capturing device 300.

The AF module 330 is coupled to the image sensor 310 and may change the focal distance with use of a step motor that may control the location of the zooming lens 314. Besides, the AF module 330 may calculate a focus value by applying a local peak searching method or a global peak searching method.

The processing unit 340 is, for instance, a central processing unit (CPU), any other programmable microprocessor or digital signal processor (DSP) for general or special purposes, and so on, and the processing unit 340 may serve to control the image sensor 310, the detector 320, and the AF module 330.

Figure 4:
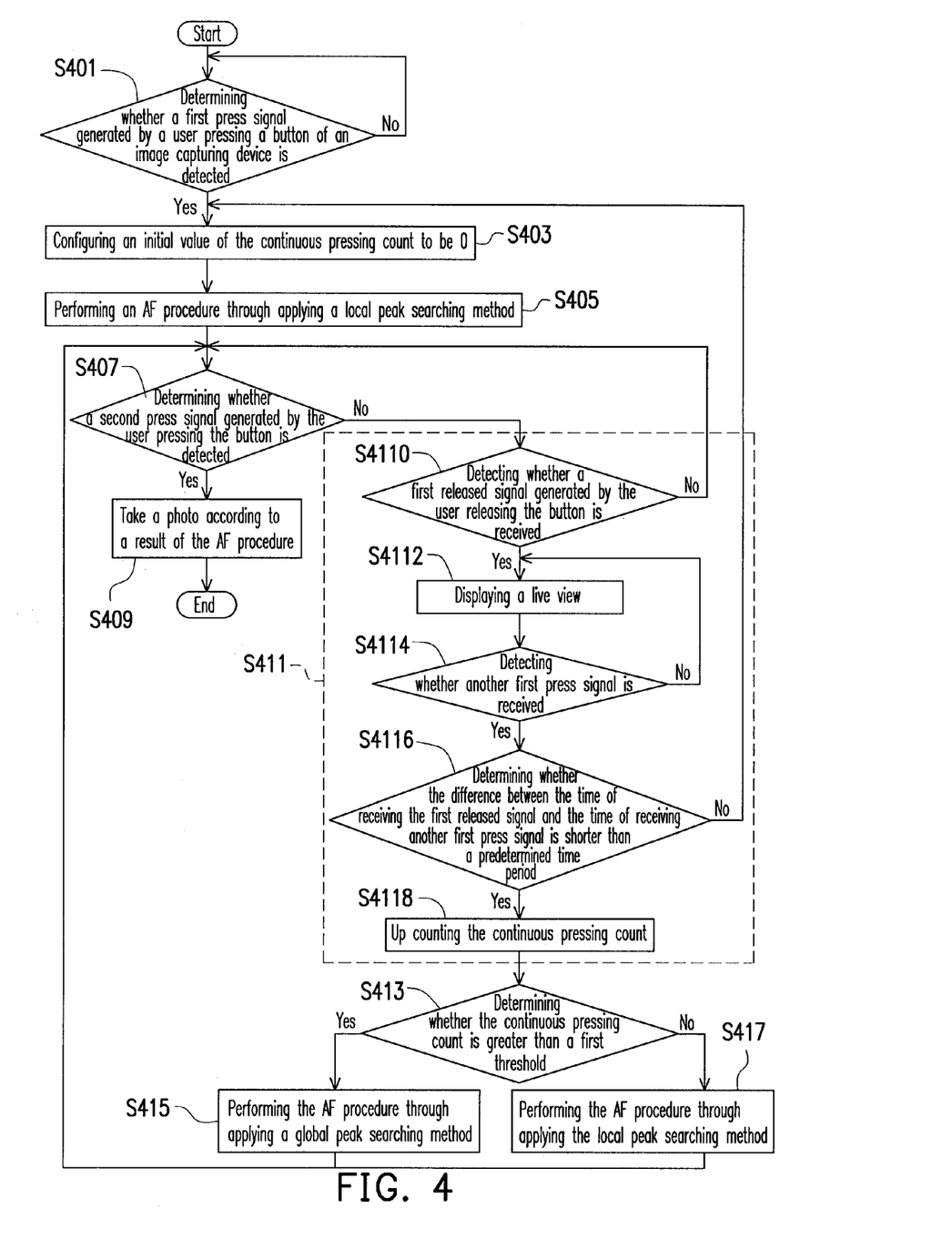
FIG. 4 is a flowchart illustrating an AF method according to an embodiment of the invention.

FIG. 4 is a flowchart illustrating an AF method according to an embodiment of the invention. The AF method described in the present embodiment is adapted for the image capturing device 300 depicted in FIG. 3, and the detailed steps of the AF method is described hereinafter with reference to the descriptions of each components in the image capturing device 300.

In the AF method, it is determined whether a first press signal that is generated by a user pressing a button of the image capturing device 300 is detected by the detector 320 in a step S401. Here, the first press signal is generated by the user pressing the button of the image capturing device 300 to perform the AF procedure. In the present embodiment, the first press signal is obtained by the user half-pressing the button of the image capturing device 300. If the first press signal is detected by the detector 320, a step S403 may be performed; if not, the detector 320 continues to detect the first press signal.

In the step S403, the processing unit 340 configures an initial value of the continuous pressing count to be 0. In a step S405, the processing unit 340 controls the AF module 330 to perform the AF procedure through applying the local peak searching method because the detector 320 detects the first press signal.

In a step S407, it is determined whether a second press signal that is generated by the user pressing the button is detected by the detector 320. Here, the second press signal is generated by the user pressing the button of the image capturing device 300 to perform an exposure procedure. In the present embodiment, the second press signal is obtained by the user completely pressing the button of the image capturing device 300. This indicates that the user ascertains that the AF procedure is successfully performed and determines to take a photo.

If the detector 320 indeed detects the second press signal, a step S409 may then be performed, i.e., the processing unit 340 controls the image sensor 310 to take a photo according to a result of the AF procedure.

Back to the step S407, if the detector 320 fails to detect the second press signal, a step S411 may then be performed, i.e., the processing unit 340 calculates the continuous pressing count according to the continuous operating signal generated by the user continuously releasing and half-pressing the button.

In a step S413, the processing unit 340 determines whether the continuous pressing count is greater than a first threshold. If the continuous pressing count is greater than the first threshold, the processing unit 340 controls the AF module to perform the AF procedure through applying a global peak searching method in a step S415. If not, the AF procedure is still performed through applying the local peak searching method in a step S417. After that, the detector 320 continues to detect whether the second press signal is received in the step S407.

The step S411 of calculating the continuous pressing count may be further divided into five sub-steps S4110 to S4118. In the sub-step S4110, the detector 320 detects whether a first released signal that is generated by the user releasing the button is received. If not, go back to the step S407; if yes, the sub-step S4112 may then be performed, i.e., the image capturing device 300 may display a live view, and thereby the user may either re-adjust the subject frame after releasing the button or again perform the AF procedure. The detector 320 then detects whether another first press signal is received after receiving the first released signal within a predetermined time period (in the sub-step S4114). Namely, the processing unit 340 determines whether the difference between the time of receiving the first released signal and the time of receiving another first press signal is shorter than a predetermined time period in the sub-step S4116. If yes, the processing unit 340 up counts the continuous pressing count in the sub-step S4118, i.e., the processing unit 340 accumulates 1 to the continuous pressing count.

According to inductive experiments, it should be mentioned that the predetermined time period may be set as 0.5 seconds, and the first threshold may be set as 5 times, for instance. However, the invention is not limited thereto, and people having ordinary skill in the art may determine the predetermined time period and the first threshold based on actual situations. That is, if another first press signal is received within 0.5 second after receiving the first released signal, the continuous pressing count is up counted by 1. After the continuous pressing count is greater than 5, the global peak searching method is employed to perform the AF procedure; otherwise, the AF procedure is still performed through applying the local peak searching method.

In general, if the user repeatedly half-presses the button and releases the button within a short period of time, it probably implies that the image capturing device fails to successfully perform the AF procedure. Thereby, the user is required to release the button and then half-press the button again to perform the AF procedure once more. However, when the local peak searching method is applied to perform the AF procedure, the autofocus may fail if a near object and a far object co-exist in the subject frame. At this time, the global peak searching method may need to be applied to perform the AF procedure. In the present embodiment, the continuous pressing count of the user is calculated within a predetermined time period to determine whether the local peak searching method or the global peak searching method is applied, so as to improve the AF accuracy.

In the event that the user repeatedly half-presses the button and releases the button within a short period of time, it may further imply that, in addition to the failure of the image capturing device to successfully perform the AF procedure, the user intends to re-select a subject to be shot or adjust the composition of the subject frame, i.e., rapidly change the scene of photography. Solutions to the above issue are correspondingly provided in the following embodiment.

Figure 5:
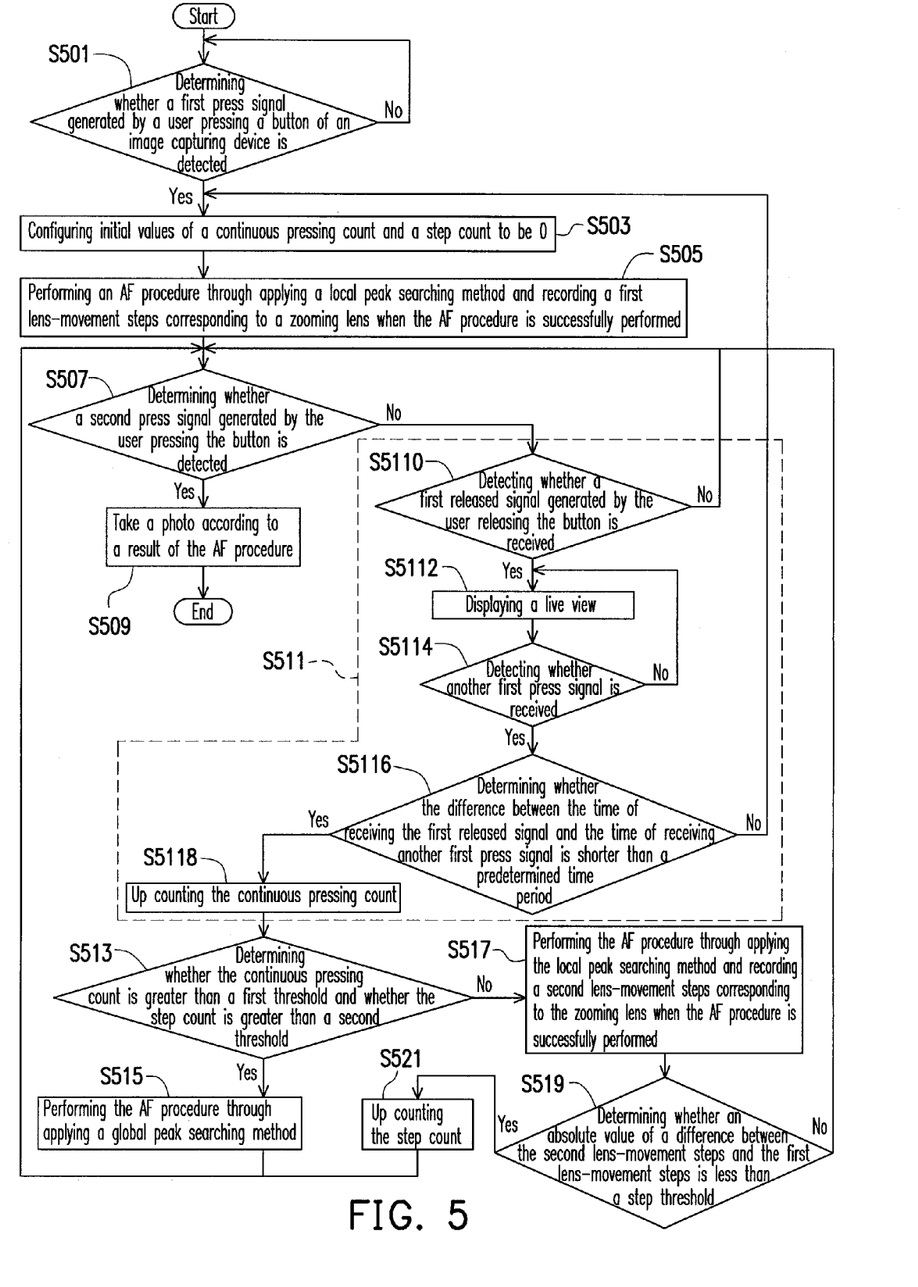
FIG. 5 is a flowchart illustrating an AF method according to another embodiment of the invention.

FIG. 5 is a flowchart illustrating an AF method according to another embodiment of the invention. The method described in the present embodiment is also applicable to the image capturing device 300 depicted in FIG. 3. Please refer to FIG. 5.

It is determined whether a first press signal that is generated by a user half-pressing a button of an image capturing device is detected in a step S501. If the first press signal is detected, initial values of the continuous pressing count and the step count are configured to be 0 in a step S503. If the first press signal is not detected, then continue to detect the first press signal.

Figure 6:
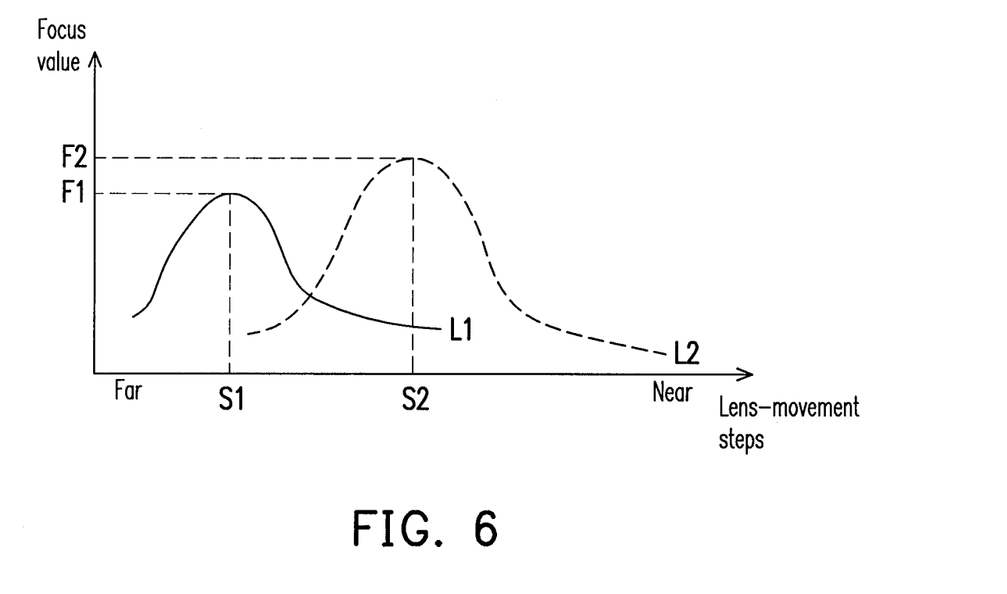
FIG. 6 is a schematic diagram illustrating a focus value curve of an image according to another embodiment of the invention.

After the continuous pressing count and the step count are initialized, a local peak searching method is applied to perform an AF procedure, and a first lens-movement steps corresponding to a zooming lens is recorded when the AF procedure is successfully performed (step S505). FIG. 6 is a schematic diagram illustrating a focus value curve of an image according to another embodiment of the invention. With reference to FIG. 6, a focus value curve L1 refers to the focus data obtained in the AF procedure, and the lens-movement steps S1 corresponding to a focus value F1 of a first region is recorded in the present embodiment.

In a step S507, it is determined whether a second press signal that is generated by the user completely pressing the button is detected. The second press signal, if being detected, indicates the user ascertains the AF procedure is successfully performed and decides to take a photo. At this time, the photo may be taken according to a result of the AF procedure (step S509). If the second press signal is not detected, a continuous operating signal generated by the user continuously releasing and half-pressing the button is detected, so as to calculate the continuous pressing count (step S511). Here, the continuous operating signal refers to the first press signal and the first released signal that are continuously generated. The step S511 may be further divided into five sub-steps S5110 to S5118 which are identical or similar to the sub-steps S4110 to S4118 described in the previous embodiment. Therefore, relevant descriptions are omitted hereinafter.

It is then determined whether the continuous pressing count is greater than a first threshold and whether the step count is greater than a second threshold (step S513). If the continuous pressing count is greater than the first threshold, and the step count is greater than the second threshold, a global peak searching method is applied to perform the AF procedure in a step S515; otherwise, the local peak searching method is applied to perform the AF procedure again, and a second lens-movement steps corresponding to the zooming lens is recorded when the AF procedure is successfully performed (step S517). With reference to FIG. 6, a focus value curve L2 refers to the focus data obtained in this AF procedure, and the lens-movement steps S2 corresponding to a focus value F2 of a second region is recorded in this step.

Different from the previous embodiment, the present embodiment discloses the AF method that further includes determining whether an absolute value of a difference between the lens-movement steps S2 (i.e., the second lens-movement steps) and the lens-movement steps S1 (i.e., the first lens-movement steps) is less than a step threshold (step S519). If the absolute value of the difference between the lens-movement steps S2 and the lens-movement steps S1 is less than the step threshold, the step count is up counted, i.e., 1 is accumulated to the step count; otherwise, the continuous pressing count and the step count are initialized, i.e., the initial values of the continuous pressing count and the step count are again configured to be 0 in the step S503.

In the present embodiment, the predetermined time period may be set as 0.5 seconds, and the first threshold may be set as 5 times, for instance. Besides, according to inductive experiments, the second threshold may be set as 2 times, and the step count may be set as 100 steps, for instance. The above-mentioned parameters are preferable but should not be construed as limitations to the invention. People having ordinary skill in the art may determine the parameters based on actual situations.

In the present embodiment, the first local peak searching method is applied to perform the AF procedure, and the lens-movement steps S1 corresponding to the zooming lens is recorded when the AF procedure is successfully performed; the second local peak searching method is applied to perform another AF procedure, and the lens-movement steps S2 corresponding to the zooming lens is recorded when the AF procedure is successfully performed. The lens-movement steps S2 is compared with the lens-movement steps S1, and if the difference there-between is greater than 100 steps, it is determined that the user already changes the scene of photography rapidly, i.e., the variation in the photo of the to-be-shot subject is overly significant. In this case, the local peak search method is still suitable for performing the fast AF procedure. By contrast, if the user quickly half-presses the button and releases the button repeatedly to focus the same scene (i.e., to take the photo of the same to-be-shot subject), the global peak searching method is applied to perform the AF procedure. Thereby, as described in the related art, under the same scene of photography, the focus procedure is first performed on the relatively far object; after a relatively near object appears in the focus frame, the global peak searching method may be automatically applied to perform the AF procedure, so as to prevent the failure to focus the relatively near object.

To sum up, based on the control of a button of an image capturing device by a user, the local peak searching method or the global peak searching method may be automatically applied. In addition, when the AF procedure is successfully performed, the resultant number of the lens-movement steps may help determine whether the user rapidly changes the scene of photography. A different focus value searching algorithm may be applied only when the user is determined to quickly half-press and release the button of the image capturing device repeatedly to focus the same scene. Thereby, not only favorable peak searching speed may be ensured, but also the improvement of AF accuracy may be guaranteed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An auto-focus method adapted for an image capturing device, the auto-focus method comprising:
    determining whether a first press signal generated by a user pressing a button of the image capturing device is detected;
    if the first press signal is detected, applying a local peak searching method to perform an auto-focus procedure;
    determining whether a second press signal generated by the user pressing the button is detected;
    if the second press signal is not detected, determining whether a first released signal generated by the user releasing the button is detected and calculating a continuous pressing count according a number of times the user presses the button and each of the continuous pressing count is upcounted by one by the user pressing the button once and releasing the button once; and
    determining whether the continuous pressing count is greater than a first threshold, and the first threshold is greater than or equal to three; if the continuous pressing count is greater than the first threshold, applying a global peak searching method to perform the auto-focus procedure; if the continuous pressing count is not greater than the first threshold, applying the local peak searching method to perform the auto-focus procedure.

2. The auto-focus method as recited in claim 1, wherein if the second press signal is not detected, the step of calculating the continuous pressing count comprises:
    after detecting the first released signal, determining whether another first press signal is detected within a predetermined time period;
    if the another first press signal is detected, up counting the continuous pressing count; and
    if the another first press signal is not detected, configuring an initial value of the continuous pressing count to be 0.

3. The auto-focus method as recited in claim 1, further comprising:
    if the continuous pressing count is not greater than the first threshold, applying the local peak searching method to perform the auto-focus procedure and continuously detecting the second press signal.

4. The auto-focus method as recited in claim 1, wherein the first press signal is generated by the user pressing the button of the image capturing device to perform the auto-focus procedure, and the second press signal is generated by the user pressing the button of the image capturing device to perform an exposure procedure.

5. The auto-focus method as recited in claim 4, wherein the first press signal is generated by the user half-pressing the button, and the second press signal is generated by the user completely pressing the button.

6. An auto-focus method adapted for an image capturing device having a zooming lens, the auto-focus method comprising:
    determining whether a first press signal generated by a user pressing a button of the image capturing device is detected;
    if the first press signal is detected, applying a local peak searching method to perform an auto-focus procedure and recording a first lens-movement steps corresponding to the zooming lens when the auto-focus procedure is successfully performed;

determining whether a second press signal generated by the user pressing the button is detected;

if the second press signal is not detected, determining whether a first released signal generated by the user releasing the button is detected and calculating the continuous pressing count according a number of times the user presses the button and each of the continuous pressing count is upcounted by one by the user pressing the button once and releasing the button once; and determining whether the continuous pressing count is greater than a first threshold, and the first threshold is greater than or equal to three; if the continuous pressing count is greater than the first threshold, applying a global peak searching method to perform the auto-focus procedure; if the continuous pressing count is not greater than the first threshold, applying the local peak searching method to perform the auto-focus procedure and recording a second lens-movement steps corresponding to the zooming lens when the auto-focus procedure is successfully performed.

7. The auto-focus method as recited in claim 6, further comprising:

determining whether an absolute value of a difference between the second lens-movement steps and the first lens-movement steps is less than a step threshold;

if the absolute value of the difference between the second lens-movement steps and the first lens-movement steps is less than the step threshold, up counting the step count; and if the absolute value of the difference between the second lens-movement steps and the first lens-movement steps is not less than the step threshold, initializing the continuous pressing count and the step count.

8. The auto-focus method as recited in claim 7, wherein the step of determining whether the continuous pressing count is greater than the first threshold further comprises:

determining whether the step count is greater than a second threshold; and if the continuous pressing count is greater than the first threshold, and the step count is greater than the second threshold, applying the global peak searching method to perform the auto-focus procedure.

9. The auto-focus method as recited in claim 6, wherein if the second press signal is not detected, the step of calculating the continuous pressing count affected by the user continuously pressing and releasing the button comprises:

after detecting the first released signal, determining whether another first press signal is detected within a predetermined time period;

if the another first press signal is detected, up counting the continuous pressing count; and if the another first press signal is not detected, initializing the continuous pressing count and the step count.

10. The auto-focus method as recited in claim 6, further comprising:

if the second press signal generated by the user pressing the button is detected, shooting an image based on a result of the auto-focus procedure.

* * * * *